United States Patent
Chen et al.

(10) Patent No.: US 11,505,425 B2
(45) Date of Patent: Nov. 22, 2022

(54) WIRELESS SIGNAL DEVICE, SYSTEM AND METHOD FOR ELEVATOR SERVICE REQUEST

(71) Applicant: Otis Elevator Company, Farmington, CT (US)

(72) Inventors: Hui Chen, Shanghai (CN); Shenhong Wang, Shanghai (CN); SiQi Ma, Shanghai (CN); Fu Qi, Shanghai (CN)

(73) Assignee: OTIS ELEVATOR COMPANY, Farmington, CT (US)

(*) Notice: Subject to any disclaimer, the term of this patent is extended or adjusted under 35 U.S.C. 154(b) by 881 days.

(21) Appl. No.: 16/394,836

(22) Filed: Apr. 25, 2019

(65) Prior Publication Data
US 2019/0330012 A1 Oct. 31, 2019

(30) Foreign Application Priority Data
Apr. 27, 2018 (CN) .......................... 201810410498.7

(51) Int. Cl.
*B66B 1/18* (2006.01)
*B66B 1/46* (2006.01)
(Continued)

(52) U.S. Cl.
CPC ............ *B66B 1/468* (2013.01); *B66B 1/2408* (2013.01); *B66B 1/3461* (2013.01); *H04W 4/06* (2013.01);
(Continued)

(58) Field of Classification Search
CPC ..... B66B 1/468; B66B 1/2408; B66B 1/3461; B66B 2201/243; B66B 2201/4653;
(Continued)

(56) References Cited

U.S. PATENT DOCUMENTS

| 985,610 A | 2/1911 | Lundin |
| 5,460,245 A * | 10/1995 | Bittar .................... B66B 1/18 |
| | | 187/383 |

(Continued)

FOREIGN PATENT DOCUMENTS

| CN | 100415624 C * | 9/2008 | ........... B66B 1/2458 |
| EP | 2261160 A1 * | 12/2010 | ........... B66B 1/2458 |

(Continued)

OTHER PUBLICATIONS

European Search Report for application EP 19170178.8, dated Oct. 18, 2019, 86 pages.

*Primary Examiner* — Mahendra R Patel
(74) *Attorney, Agent, or Firm* — Cantor Colburn LLP

(57) ABSTRACT

A wireless signal device, a system and a method for an elevator service request are provided, which belong to the field of elevator technologies. The wireless signal device according to the present invention is mounted in a landing zone and receives an elevator service request command from a personal mobile terminal. The wireless signal device comprises a service control unit configured to, in an elevator dispatching service process arranged in response to a first elevator service request command received previously, disable the elevator controller from responding to a second elevator service request command received later for controlling the elevator dispatching service in the elevator dispatching service process if the second elevator service request command has the same elevator call direction as the first elevator service request command.

20 Claims, 3 Drawing Sheets

(51) Int. Cl.
*B66B 1/24* (2006.01)
*B66B 1/34* (2006.01)
*H04W 4/06* (2009.01)

(52) U.S. Cl.
CPC . *B66B 2201/243* (2013.01); *B66B 2201/4653* (2013.01)

(58) Field of Classification Search
CPC . B66B 2201/4684; B66B 1/14; B66B 1/3415; B66B 3/02; B66B 2201/4638; H04W 4/06
USPC .......................................................... 187/387
See application file for complete search history.

(56) References Cited

U.S. PATENT DOCUMENTS

| | | | |
|---|---|---|---|
| 6,209,685 B1 | 4/2001 | Zaharia | |
| 6,948,592 B2 | 9/2005 | Kavounas | |
| 7,134,530 B2 | 11/2006 | Motoyama et al. | |
| 7,426,981 B2 | 9/2008 | Bacellar et al. | |
| 7,552,800 B2 | 6/2009 | Puskala et al. | |
| 7,793,762 B2 | 9/2010 | Zaharia et al. | |
| 8,028,809 B2 * | 10/2011 | Blackaby | B66B 1/462 187/391 |
| 8,260,042 B2 | 9/2012 | Peng et al. | |
| 8,397,874 B2 | 3/2013 | De Groot | |
| 8,525,652 B2 * | 9/2013 | Takeuchi | B66B 1/462 187/391 |
| 9,108,824 B2 * | 8/2015 | Hughes | B66B 5/0025 |
| 9,174,824 B2 | 11/2015 | Tokura | |
| 9,265,056 B2 | 2/2016 | Lee et al. | |
| 9,323,232 B2 | 4/2016 | Blom | |
| 10,683,190 B2 * | 6/2020 | Chapman | B66B 1/18 187/383 |
| 2009/0133969 A1 * | 5/2009 | Zaharia | B66B 1/468 187/388 |
| 2010/0025163 A1 * | 2/2010 | Amano | B66B 1/2458 187/382 |
| 2015/0075914 A1 * | 3/2015 | Armistead | G06Q 10/1093 187/247 |
| 2015/0329316 A1 * | 11/2015 | Lee | B66B 1/462 187/391 |
| 2016/0251199 A1 | 9/2016 | Kronkvist et al. | |
| 2017/0115122 A1 | 4/2017 | Salmikuukka | |
| 2018/0346282 A1 * | 12/2018 | Simcik | B66B 1/3461 |
| 2018/0346283 A1 * | 12/2018 | Scoville | B66B 5/0012 |

FOREIGN PATENT DOCUMENTS

| | | | |
|---|---|---|---|
| EP | 2261160 A1 | 12/2010 | |
| JP | 3983344 B2 * | 9/2007 | ................ B66B 1/18 |
| WO | 02059029 A1 | 8/2002 | |
| WO | WO-02059029 A1 * | 8/2002 | ................ B66B 1/34 |
| WO | WO-2006059983 A2 * | 6/2006 | ............. B66B 1/462 |
| WO | WO-2009123014 A1 * | 10/2009 | ........... B66B 1/2458 |
| WO | WO-2016126688 A1 * | 8/2016 | ........... B66B 1/2458 |

* cited by examiner

WIRELESS SIGNAL DEVICE, SYSTEM AND METHOD FOR ELEVATOR SERVICE REQUEST

FOREIGN PRIORITY

This application claims priority to Chinese Patent Application No. 201810410498.7, filed Apr. 27, 2018, and all the benefits accruing therefrom under 35 U.S.C. § 119, the contents of which in its entirety are herein incorporated by reference.

TECHNICAL FIELD

The present invention relates to the field of elevator technologies, and in particular, to a wireless signal device, a system and a method for an elevator service request.

BACKGROUND

In order to improve passenger experience, an elevator system is provided with a wireless signal device to interact with a personal mobile terminal carried by a passenger, thus implementing an elevator service request function such as an automatic elevator call. For example, an "up" or "down" elevator call operation is completed automatically when the passenger enters the coverage of a wireless signal broadcast by the wireless signal device.

For a wireless signal device mounted in a landing zone, it is uncertain when a passenger enters the coverage of its wireless signal. For example, passengers may continuously enter the coverage of the wireless signal, thereby continuously sending elevator service requests to the wireless signal device.

SUMMARY OF THE INVENTION

According to a first aspect of the present invention, a wireless signal device for broadcasting a wireless signal is provided, the wireless signal device is mounted in a landing zone and receives one or more elevator service request commands from a personal mobile terminal, and the wireless signal device is capable of communicating with an elevator controller of an elevator system and sending the received elevator service request command(s) to the elevator controller for controlling an elevator dispatching service, wherein the wireless signal device further comprises a service control unit configured to, in an elevator dispatching service process arranged in response to a first elevator service request command received previously, disable the elevator controller from responding to a second elevator service request command received later for controlling the elevator dispatching service in the elevator dispatching service process if the second elevator service request command has the same elevator call direction as the first elevator service request command; wherein the elevator dispatching service process is from the moment when the response to the first elevator service request command begins till the moment when an elevator car dispatched to stop begins to leave from the landing zone.

In the wireless signal device according to an embodiment of the present invention, the service control unit is further configured to determine that the elevator car begins to leave from the landing zone when the elevator car has moved to a next floor.

In the wireless signal device according to an embodiment of the present invention, the wireless signal device is further configured to receive the second elevator service request command again that is sent from the personal mobile terminal and not correspondingly responded to by the elevator controller in the service process after the elevator dispatching service process is ended; and the service control unit is further configured to arrange, through the elevator controller, a next elevator dispatching service process for the second elevator service request command received again.

In the wireless signal device according to an embodiment of the present invention, the service control unit is further configured to: store the second elevator service request command received in a time period when the elevator car stops in the landing zone in the elevator dispatching service process, and send the second elevator service request command to the elevator controller for controlling the elevator dispatching service after the elevator car begins to leave from the landing zone.

In the wireless signal device according to an embodiment of the present invention, the service control unit is further configured to: disable the elevator controller from responding to the second elevator service request command for controlling the elevator dispatching service by not sending the second elevator service request command to the elevator controller in the elevator dispatching service process.

In the wireless signal device according to an embodiment of the present invention, the service control unit is provided with a corresponding flag bit for the elevator service command in each elevator call direction; when the flag bit is set to a first state, the elevator controller is disabled from responding to the elevator service request command having the same elevator call direction as the first elevator service request command for controlling the elevator dispatching service in the elevator dispatching service process; and when the flag bit is set to a second state, the elevator controller is enabled to arrange a corresponding elevator dispatching service process in response to the first elevator service request command.

In the wireless signal device according to an embodiment of the present invention, the service control unit is provided with: a state control module configured to switch the flag bit from the first state to the second state when it is determined that the elevator car dispatched to stop begins to leave In the wireless signal device according to an embodiment of the present invention, the state control module is further configured to: switch the flag bit from the second state to the first state when the first elevator service request command is received for the first time in the second state.

In the wireless signal device according to an embodiment of the present invention, the service control unit further includes: a sending module configured to control whether to send the received elevator service request command(s) to the elevator controller.

The wireless signal device according to an embodiment of the present invention further comprises: a stop determining unit configured to determine that the elevator car dispatched to stop stops in the landing zone when stop floor information sent by the elevator controller is the same as floor information of the landing zone where the wireless signal device is located or a corresponding elevator service request indicator light of the landing zone changes from ON to OFF.

The wireless signal device according to an embodiment of the present invention further comprises: a floor information acquiring unit configured to acquire the corresponding stop floor information when the elevator service request indicator light changes from ON to OFF and use the corresponding stop floor information as the floor information of the landing zone where the wireless signal device is located, wherein the elevator service request indicator light and the wireless signal device are mounted on the same floor.

In the wireless signal device according to an embodiment of the present invention, the floor information acquiring unit is configured to acquire the stop floor information from the elevator controller.

In the wireless signal device according to an embodiment of the present invention, the floor information acquiring unit is configured to: obtain state information of the elevator service request indicator light from the elevator controller, or acquire the state information of the elevator service request indicator light by connecting to the light.

In the wireless signal device according to an embodiment of the present invention, the state control module is further configured to determine whether the elevator car has moved to the next floor by comparing information of a floor where the elevator car is located sent by the elevator controller with floor information of the landing zone where the wireless signal device is located.

The wireless signal device according to an embodiment of the present invention further comprises: a responding unit configured to still send to the personal mobile terminal information indicating that the second elevator service request command is successfully responded, when the second elevator service request command is received in the elevator dispatching service but the elevator dispatching service is not controlled in response to the second elevator service request command.

In the wireless signal device according to an embodiment of the present invention, the elevator dispatching service process is from the moment when the response to the first elevator service request command begins till the moment when the elevator car dispatched to stop begins to leave from the landing zone.

In the wireless signal device according to an embodiment of the present invention, the wireless signal device is a Bluetooth module or a Bluetooth low energy module.

According to a second aspect of the present invention, a system for an elevator service request is provided, comprising: a wireless signal device mounted in a landing zone and configured to broadcast a wireless signal, wherein the wireless signal device receives one or more elevator service request commands from a personal mobile terminal carried by a passenger; an elevator controller communicating with the wireless signal device and capable of controlling an elevator dispatching service based on the received elevator service request command(s); and a service control unit configured to, in an elevator dispatching service process arranged in response to a first elevator service request command received previously, disable the elevator controller from responding to a second elevator service request command received later for controlling the elevator dispatching service in the elevator dispatching service process if the second elevator service request command has the same elevator call direction as the first elevator service request command, wherein the elevator dispatching service process is from the moment when the response to the first elevator service request command begins till the moment when an elevator car dispatched to stop begins to leave from the landing zone.

According to a third aspect of the present invention, an elevator system is provided, comprising: an elevator car; an elevator controller configured to control an elevator dispatching service over one or more elevator cars based on elevator service request commands; and the wireless signal device as described in any of the foregoing.

According to a fourth aspect of the present invention, a method for an elevator service request is provided, comprising steps of: receiving, through a wireless signal device mounted in a landing zone, one or more elevator service request commands from a personal mobile terminal; allowing an elevator controller to arrange an elevator dispatching service in response to a first elevator service request command received previously; and disabling the elevator controller from responding to a second elevator service request command received later for controlling an elevator dispatching service in the elevator dispatching service process if the second elevator service request command has the same elevator call direction as the first elevator service request command, wherein the elevator dispatching service process is from the moment when the response to the first elevator service request command begins till the moment when an elevator car dispatched to stop begins to leave from the landing zone.

The method according to an embodiment of the present invention further comprises a step of: determining that the elevator car begins to leave from the landing zone when the elevator car has moved to a next floor.

The method according to an embodiment of the present invention further comprises steps of: receiving the second elevator service request command again that is sent from the personal mobile terminal and not correspondingly responded to by the elevator controller in the service process after the elevator dispatching service process is ended; and arranging, through the elevator controller, a next elevator dispatching service process for the second elevator service request command received again.

The method according to an embodiment of the present invention further comprises steps of: storing the second elevator service request command received in a time period when the elevator car stops in the landing zone in the elevator dispatching service process; and sending the second elevator service request command to the elevator controller for controlling the elevator dispatching service after the elevator car begins to leave from the landing zone.

In the method according to an embodiment of the present invention, the second elevator service request command is not sent to the elevator controller in the elevator dispatching service process so that the elevator controller is disabled from responding to the second elevator service request command for controlling the elevator dispatching service.

In the method according to an embodiment of the present invention, a corresponding flag bit provided for the elevator service command in each elevator call direction is used in the method; when the flag bit is set to a first state, the elevator controller is disabled from responding to the elevator service request command having the same elevator call direction as the first elevator service request command for controlling the elevator dispatching service in the elevator dispatching service process; and when the flag bit is set to a second state, the elevator controller is enabled to arrange a corresponding elevator dispatching service process in response to the first elevator service request command.

The method according to an embodiment of the present invention further comprises a step of: switching the flag bit from the first state to the second state when it is determined that the elevator car dispatched to stop begins to leave from the landing zone in each elevator dispatching service process.

The method according to an embodiment of the present invention further comprises a step of: switching the flag bit from the second state to the first state when the first elevator service request command is received for the first time in the second state.

The method according to an embodiment of the present invention further comprises a step of: determining that the elevator car dispatched to stop stops in the landing zone when stop floor information sent by the elevator controller is the same as floor information of the landing zone where the wireless signal device is located or a corresponding elevator service request indicator light of the landing zone changes from ON to OFF.

The method according to an embodiment of the present invention further comprises a step of: acquiring the corresponding stop floor information when the elevator service request indicator light changes from ON to OFF and using the corresponding stop floor information as the floor information of the landing zone where the wireless signal device is located, wherein the elevator service request indicator light and the wireless signal device are mounted on the same floor.

In the method according to an embodiment of the present invention, in the step of acquiring the floor information of the landing zone where the wireless signal device is located, the stop floor information is acquired from the elevator controller.

In the method according to an embodiment of the present invention, in the step of acquiring the floor information of the landing zone where the wireless signal device is located, state information of the elevator service request indicator light is obtained from the elevator controller, or the state information of the elevator service request indicator light is acquired from the elevator service request indicator light.

In the method according to an embodiment of the present invention, in the step of determining that the elevator car begins to leave from the landing zone: it is determined whether the elevator car has moved to the next floor by comparing information of a floor where the elevator car is located sent by the elevator controller with floor information of the landing zone where the wireless signal device is located.

The method according to an embodiment of the present invention further comprises a step of: still sending to the personal mobile terminal information indicating that the second elevator service request command is successfully responded to, when the second elevator service request command is received in the elevator dispatching service but the elevator dispatching service is not controlled in response to the second elevator service request command.

In the method according to an embodiment of the present invention, the elevator dispatching service process is from the moment when the response to the first elevator service request command begins till the moment when the elevator car dispatched to stop begins to leave from the landing zone.

According to a fifth aspect of the present invention, a computer readable storage medium with a computer program stored thereon is provided, wherein the program is executable by a processor to implement the steps of the method as described in any of the foregoing.

The above features and operations of the present invention will become more evident according to the following descriptions and accompanying drawings.

BRIEF DESCRIPTION OF THE DRAWINGS

The above and other objectives and advantages of the present invention will become clearer and more complete from the following detailed descriptions of the accompanying drawings. The same or similar elements are represented with the same reference numerals.

DETAILED DESCRIPTION

Figure 1:
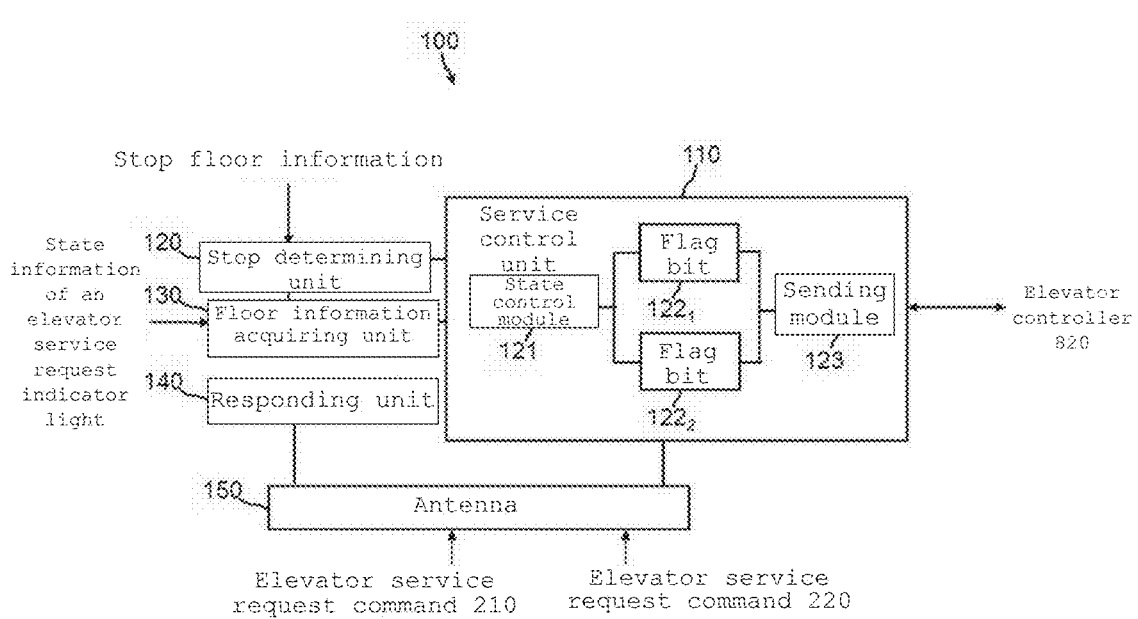
FIG. 1 is a schematic diagram of a wireless signal device for broadcasting a wireless signal according to an embodiment of the present invention.

The following are descriptions about exemplary embodiments of the present invention. Examples of these embodiments are shown in the accompanying drawings. Whenever possible, the same reference numerals will be used in all the accompanying drawings to refer to the same or similar parts.

For the purpose of conciseness and illustration, the principles of the present invention are described in this text mainly with reference to the exemplary embodiments. However, it is easy for those skilled in the art to realize that the same principles can be equivalently applied to all types of wireless signal devices, personal mobile terminals, systems that use the wireless signal devices and the personal mobile terminals, and/or their corresponding execution methods, the same principles can be implemented therein, and any such change does not depart from the true spirit and scope of this patent application. Moreover, in the following description, references are made to the accompanying drawings showing specific exemplary embodiments. The embodiments can be electrically, mechanically, logically and structurally modified without departing from the spirit and scope of the present invention. In addition, although the feature of the present invention is disclosed in combination with only one of a number of implementations/embodiments, the feature may be combined with one or more other features of other implementations/embodiments if the combination is expected and/or advantageous for any given or identifiable function. Therefore, the following description shall not be considered restrictive and the scope of the present invention is defined by the appended claims and their equivalents.

Figure 2:
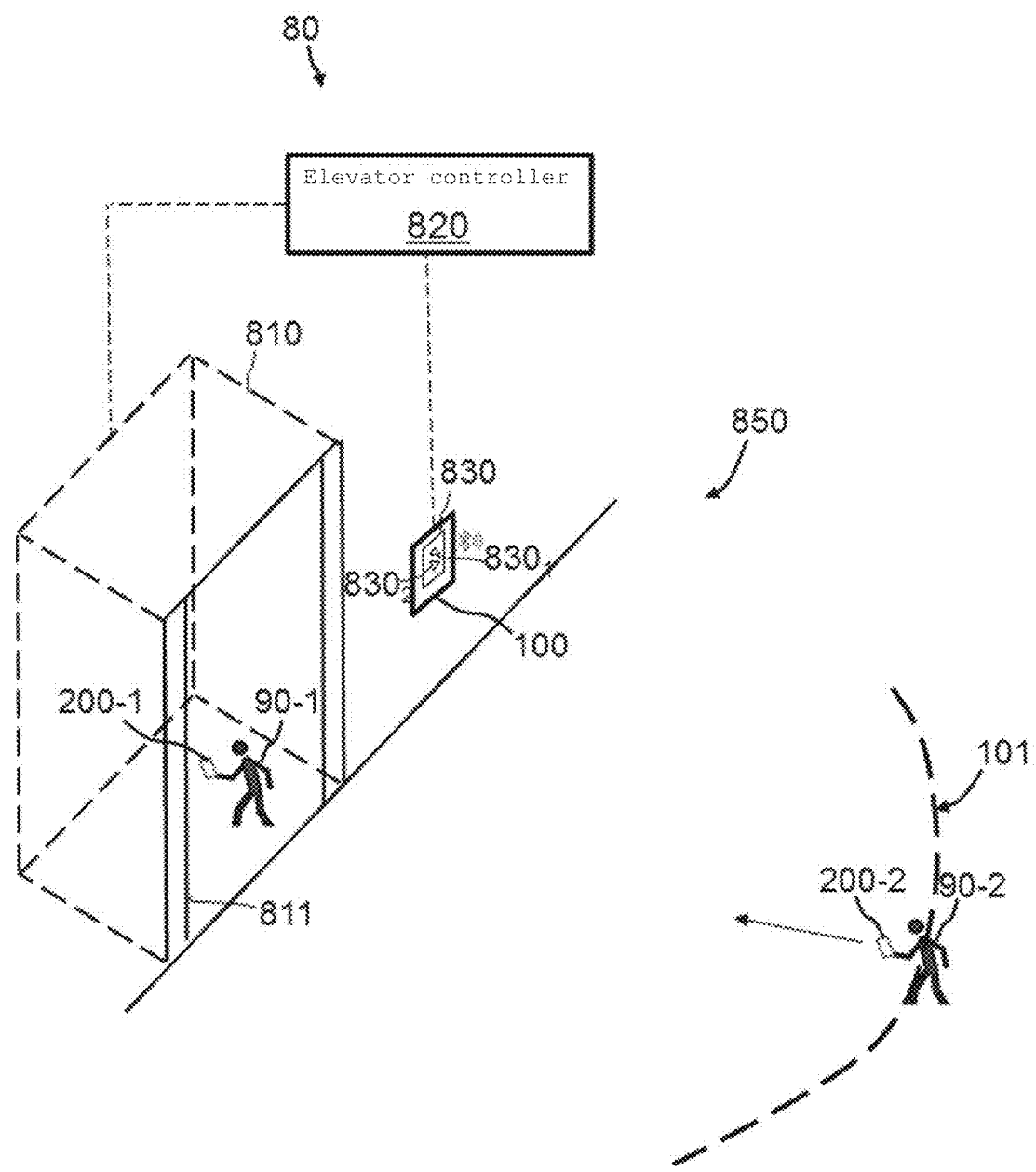
FIG. 2 is a schematic diagram of a structure and an application scenario of an elevator system according to an embodiment of the present invention.

FIG. 1 is a schematic diagram of a wireless signal device for broadcasting a wireless signal according to an embodiment of the present invention. FIG. 2 is a schematic diagram of a structure and an application scenario of an elevator system according to an embodiment of the present invention. A wireless signal device, a system for an elevator service request that uses the wireless signal device, and an elevator system according to an embodiment of the present invention are illustrated in the following with reference to examples of FIG. 1 to FIG. 2.

As shown in FIG. 1, a wireless signal device 100 can be applied to a system for an elevator service request, for example, it serves as a part of the system for an elevator service request included in an elevator system 80 as shown in FIG. 2. The wireless signal device 100 is configured to implement short-range wireless communication with a personal mobile terminal 200 carried by a passenger 90. The wireless signal device is mounted in a landing zone 850 and can continuously or intermittently broadcast wireless signals to the landing zone 850 by an antenna 150. Communication interaction between the wireless signal device and the personal mobile terminal 200 according to an embodiment of the present invention can be implemented based on the wireless signal, so that the personal mobile terminal 200 can automatically complete an elevator service request.

In the process of automatically completing the elevator service request, for example, once the passenger 90 carrying the personal mobile terminal 200 enters the coverage 101 of the wireless signal broadcast by the wireless signal device 100 (as shown in FIG. 2), the personal mobile terminal 200 will generate a corresponding elevator service request command (for example, an elevator service request command for an "up" elevator call or an elevator service request command for a "down" elevator call), and establish a wireless connection with the wireless signal device 100 to send the elevator service request command to the wireless signal device 100. The wireless signal device 100 can be coupled to an elevator controller 820 of the elevator system 80, and can send the elevator service request command to the elevator controller 820. Correspondingly, the elevator controller 820 responds to the elevator service request command, for example, dispatches a corresponding elevator car 810 to stop in the landing zone 850, thus controlling the elevator service. Therefore, for the elevator service request command, the wireless signal device 100 serves as a relay device between the personal mobile terminal 200 and the elevator controller 820 under most circumstances.

In the elevator system 80 shown in FIG. 2, when receiving a corresponding elevator service request command, the elevator controller 820 can arrange an elevator dispatching service process in response to the elevator service request command, regardless of whether the elevator service request command is from a personal mobile terminal or another component (for example, an elevator service request command manually input). An elevator dispatching service process is from the moment when the response to the elevator service request command begins till the moment when the elevator car 810 dispatched to stop begins to leave from the landing zone 850. In an embodiment, an elevator dispatching service process may refer to a process from the moment when the response to the elevator service request command begins till the moment when the elevator car 810 dispatched to stop begins to leave from the landing zone 850.

However, in a scenario similar to FIG. 2, as multiple passengers 90 (such as passengers 90-1 and 90-2) enter the coverage of the wireless signal 101 successively, elevator service request commands are also sent by the passengers successively. For example, after the passenger 90-1 first sends an elevator service request command for an "up" elevator call through a personal mobile terminal 200-1, the elevator controller 820 will schedule the elevator car 810 to stop in the landing zone 850 to carry the passenger 90-1 upward. That is, the elevator controller will arrange an elevator dispatching service process in response to the elevator service request command of the passenger 90-1. In the elevator dispatching service process, normally, a car door 811 is opened, the passenger 90-1 enters the elevator car 810, then the car door 811 is closed, and the elevator car begins to leave from the landing zone 850. However, in the stopping process, if the passenger 90-2 in the distance enters the coverage 101 of the wireless signal afterwards and a personal mobile terminal 200-2 carried by the passenger 90-2 later sends an elevator service request command for an "up" elevator call (that is, it has the same elevator call direction as the elevator service request command of the passenger 90-1), the elevator controller 820 controls an elevator dispatching service in response to the elevator service request command of the personal mobile terminal 200-2. Thus, the car door 811 is kept open under the control of an instruction related to the control over the elevator dispatching service. Once multiple passengers similar to the passenger 90-2 continuously enter the coverage 101 of the wireless signal in the stopping process of the elevator car 810, it could be appreciated that it is difficult to close the car door 811 to move upward. Therefore, the operating efficiency of the elevator system is reduced, which also greatly lowers passenger experience, especially the experience of the passenger 90-1 who has entered the elevator car 810. Moreover, since the coverage 101 may be relatively large, even if the elevator controller 820 responds to the elevator service request command of the passenger 90-2 to control the elevator dispatching service, the passenger 90-2 may not have time to enter the elevator car 810 at all.

In an embodiment, the wireless signal device 100 is provided with a service control unit 110. In an elevator dispatching service process arranged in response to an elevator service request command 210 received previously (for example, received by the antenna 150), the service control unit 110 disables the elevator controller 820 from responding to one or more later received elevator service request commands 220 for controlling the elevator dispatching service in the elevator dispatching service process if the one or more elevator service request commands 220 have the same elevator call direction as the elevator service request command 210. An elevator dispatching service process corresponding to the elevator service request command 210 is from the moment when the response to the elevator service request command 210 begins till the moment when the elevator car 810 dispatched to stop begins to leave from the landing zone 850.

It should be noted that when the elevator car 810 begins to leave from the landing zone 850, the car door 811 will not be opened in response to any elevator service request command currently. After the elevator car 810 begins to leave from the landing zone 850, the stop of the elevator car in the elevator dispatching service process will not be affected even if the elevator car 820 continues to respond to the elevator service request command 220 to control the elevator dispatching service, that is, the car door 811 will not be kept open.

In an embodiment, the elevator service request command 220 is not sent to the elevator controller 820 in the elevator dispatching service process so that the elevator controller 820 is disabled from responding to the elevator service request command 220 for controlling the elevator dispatching service. It would be appreciated that the service control unit 110 may also implement the procedure in another manner. For example, instruction information corresponding to the second elevator service request command 220 is sent to the elevator controller 820, so that the elevator controller 820 is informed that it is unnecessary to control the elevator dispatching service in response to the elevator service request command 220.

As such, in the elevator dispatching service process, the number of elevator service request commands sent to the elevator controller 820 of the elevator system 80 and having the same elevator call direction is reduced and the control over the elevator dispatching service by the elevator controller 820 is also reduced at least in a time period when the elevator car 810 stops. Therefore, the possibility that the elevator controller 820 controls the car door 811 to keep open is reduced, the car door 811 can be timely and normally closed, the passenger experience is improved, and the operating efficiency of the elevator system is also improved.

Moreover, the workload of the elevator controller 820 in terms of control over the elevator dispatching service is also greatly reduced.

It should be noted that the elevator service request commands may have "up" and "down" elevator call directions. At a lobby floor and a top floor of a building, for example, the elevator service request commands may only have an "up" elevator call direction and a "down" elevator call direction. In an embodiment, the elevator service request command may be an elevator call direction. In another embodiment, the elevator service request command not only includes elevator call direction information but also includes destination floor information. The destination floor information may not be taken into account when it is judged whether the elevator service request command 220 has the same elevator call direction as the elevator service request command 210.

It should be noted that a time period during which the elevator car stops in the landing zone 850 refers to a time period from the moment when the car door 811 of the elevator car 810 begins to open till the moment when it is confirmed that the car door 811 has been closed and the elevator car is ready to move upward or downward.

It should be appreciated that in a state where the elevator car 810 dispatched to stop begins to leave from the landing zone 850, the car door 811 will not open again even if an elevator service request command similar to the elevator service request command 220 is received and the elevator dispatching service is controlled. Such a state can be determined in many manners. For example, when the elevator car 810 has moved to the next floor, it is determined that the elevator car 810 begins to leave from the landing zone 850.

In an embodiment, the wireless signal device 100 can be a Bluetooth module, and is specifically, for example, a Bluetooth Low Energy (BLE) module, which can broadcast a Bluetooth signal. Correspondingly, a Bluetooth communication module is selected as the wireless communication unit of the personal mobile terminal 200. The Bluetooth communication module and the Bluetooth module can conduct Bluetooth interactive communication based on, for example, a Bluetooth4.0 protocol. It would be appreciated that the wireless signal device 100 may also be other types of wireless signal devices such as a Wifi module, or other wireless signal devices known by those skilled in the art and similar to the Bluetooth module, such as an infrared module.

In an embodiment, as shown in FIG. 1, the service control unit 110 is provided with flag bits 122. Each flag bit 122 is set corresponding to an elevator service command in each elevator call direction. For example, a flag bit 122₁ corresponds to an elevator service request command for an "up" elevator call, and a flag bit 122₂ corresponds to an elevator service request command for a "down" elevator call. The flag bit 122 can be used to identify whether an elevator service request command in a certain direction has been sent to the elevator controller 820 or whether the elevator controller 820 can control the elevator dispatching service based on the elevator service request command.

When the flag bit 122 is in a second state (for example, the state "0"), it indicates that the service control unit 110 enables the elevator controller 820 to arrange a corresponding elevator dispatching service process in response to an elevator service request command 210 in a certain elevator call direction, or further indicates that before an elevator service request command 210 in a certain elevator call direction is correspondingly received, no elevator service request command 210 in the elevator call direction has been sent to the elevator controller 820. The elevator service request command 210 received in the state "0" can be sent to the elevator controller 820, and then the elevator controller 820 responds to the elevator service request command 210 to control the elevator dispatching. For example, an elevator dispatching service process is arranged for the elevator service request command 210, including a dispatched elevator car 810.

When the flag bit 122 is in a first state (for example, the state "1"), it indicates that the service control unit 110 disables the elevator controller 820 from responding to the elevator service request command 220 having the same elevator call direction as the elevator service request command 210 for controlling the elevator dispatching service in the elevator dispatching service process, or further indicates that the previous elevator service request command 210 has been sent to the elevator controller 820. The elevator service request command 220 received in the state "1" will not be sent to the elevator controller 820, and the flag bit 122 is set to the state "1" at least in the time period of stop in this elevator dispatching service process.

State transition is controllable for each flag bit 122. In the embodiments as shown in FIG. 1 and FIG. 2, the service control unit 110 is provided with a state control module 122. The state control module 122 is configured to switch the flag bit 122 from the state "1" to the state "0" when it is determined that the elevator car 810 dispatched to stop begins to leave from the landing zone 850 in each elevator dispatching service process. Specifically, the state control module 122 is configured to switch the flag bit 122 from the state "1" to the state "0" when it is determined that the elevator car 810, which has stopped at the landing zone 850, moves to the next floor (for example, the next floor in the upward direction or the next floor in the downward direction) based on scheduling control of the elevator service request command 210.

Further, the state control module 122 is further configured to switch the flag bit from the state "0" to the state "1" when the first elevator service request command 210 in a certain direction is received in the state "0."

[For example, in the subsequent scenario as shown in FIG. 2, by taking the elevator service request command for an "up" elevator call as an example, it is assumed that after the stop of the elevator car 810 at the landing zone 850 is ended (that is, the elevator car begins to leave from the landing zone 850), the car door 811 is closed normally and the elevator car carries upwards the passenger 90-1 sending the elevator service request command 210 for an "up" elevator call. For example, when the elevator car moves upwards to the next floor, at this point, an elevator dispatching service process corresponding to the elevator service request command 210 of the passenger 90-1 is ended, and the flag bit 122₁ is set to the state "0." It is assumed that after the flag bit 122₁ is set to the state "0," the passenger 90-2 enters the coverage 101 of the wireless signal and will continue to send the elevator service request command for an "up" elevator call; the wireless signal device 100 will continue to receive the elevator service request command and judge whether the elevator service request command 210 is the first elevator service request command 210 for an "up" elevator call received after the flag bit 122₁ is set to the state "0." If the judgment is "yes," the flag bit 122₁ is set to the state "1," and another elevator dispatching service process is arranged for the passenger 90-2. When the flag bit 122₁ is set to the state "1," if a passenger after the passenger 90-2 sends another elevator service request command for an "up" elevator call, the commend will not be sent to the elevator controller 820. For example, the elevator service request command for an "up" elevator call sent by the passenger after the passenger 90-2 is received by the wireless signal device 100 and resides in the wireless signal device 100 (not further sent to the elevator controller 820 for controlling the elevator dispatching service) at least before the flag bit $122_1$ is set to the state "0" once again.

In the wireless signal device 100 according to the foregoing embodiments, it may also be necessary to know whether the elevator car 810 stops in the corresponding landing zone 850. To this end, as shown in FIG. 1, the wireless signal device 100 is further provided with a stop determining unit 120.

In an embodiment, when the elevator controller 820 controls the elevator car 810 to move or stop, the elevator controller 820 sends stop floor information, for example, sends current stop floor information to a broadcaster for broadcasting, when the elevator car 810 stops in the landing zone of each floor. The stop determining unit 120 can also acquire the stop floor information conveniently from the elevator controller 820. When the stop floor information sent by the elevator controller 820 is the same as floor information of the landing zone 850 where the wireless signal device 100 is located, the stop determining unit 120 determines that the elevator car 810 currently stops in the landing zone 850 where the wireless signal device 100 is located.

In another embodiment, the wireless signal device 100 is generally provided with an elevator service request indicator light 830 (as shown in FIG. 2) correspondingly, for example, elevator service request indicator lights $830_1$ and $830_2$. When receiving an elevator service request command for an "up" elevator call, the elevator controller 820 controls the elevator service request indicator light $830_1$ to light up. When the elevator controller 820 schedules the elevator car 810 to stop in the landing zone 850 based on the elevator service request command for an "up" elevator call, the elevator controller 820 controls the elevator service request indicator light $830_1$ to change from ON to OFF. Similarly, when receiving an elevator service request command for a "down" elevator call, the elevator controller 820 controls the elevator service request indicator light $830_2$ to light up. When the elevator controller 820 schedules the elevator car 810 to stop in the landing zone 850 based on the elevator service request command for a "down" elevator call, the elevator controller 820 controls the elevator service request indicator light $830_2$ to change from ON to OFF. According to the characteristic that the elevator service request indicator light 830 changes from ON to OFF when the elevator car 810 stops in the landing zone 850, the stop determining unit 120 determines that the elevator car 810 stops in the landing zone 850 where the wireless signal device 100 is located when the corresponding elevator service request indicator light 830 of the landing zone 850 changes from ON to OFF.

It should be noted that the wireless signal device 100 can know, in many manners, a change in state information indicating that the corresponding elevator service request indicator light 830 changes from ON to OFF. In an example, the wireless signal device 100 can be connected to the elevator controller 820, and obtain state information of the elevator service request indicator light 830 from the elevator controller 820. In another example, the wireless signal device 100 can be directly connected to the elevator service request indicator light 830 by a corresponding type of interface to directly acquire or detect its state information from the elevator service request indicator light 830.

The wireless signal device 100 in the foregoing embodiments may also need to know which floor it is on. Correspondingly, as shown in FIG. 1, the wireless signal device 100 is further provided with a floor information acquiring unit 130. The elevator service request indicator light 830 and the wireless signal device 100 are mounted on the same floor. That is, they have the same floor information (as shown in FIG. 2). When the corresponding elevator service request indicator light 830 changes from ON to OFF, the floor information acquiring unit 130 acquires corresponding stop floor information (for example, the latest stop floor information broadcast by the elevator controller 820) and uses the stop floor information as the floor information of the landing zone 850 where the wireless signal device 100 is located. As such, the wireless signal device 100 can conveniently obtain the floor information of the landing zone 850 where it is located. During mounting or maintenance of the wireless signal device 100, it is unnecessary to write the floor information of the landing zone 850 where the wireless signal device 100 is located into the wireless signal device 100 in advance, thus simplifying the mounting or maintenance process of the wireless signal device 100.

It would be appreciated that the floor information of the landing zone 850 where the wireless signal device 100 is located obtained by the floor information acquiring unit 130 can be stored in the wireless signal device 100 for subsequent use, for example, for determining whether the elevator car stops in the landing zone 850 where the wireless signal device 100 is located. Definitely, the floor information thereof can also be determined continuously each time the elevator service request indicator light 830 changes from ON to OFF.

It should be noted that the floor where the landing zone 850 is specifically located is not limited, for example, it can be the first floor or top floor of a building or a middle floor of the building. The wireless signal device 100 may be mounted in the landing zone 850 of each floor according to the example as shown in FIG. 2.

The floor information determined by the floor information acquiring unit 130 can be used by the service control unit 110, the stop determining unit 120, and so on. In an embodiment, the state control module 121 of the service control unit 110 is further configured to determine whether the elevator car 810 has moved to the next floor by comparing information of a floor where the elevator car 810 is located sent by the elevator controller 820 with floor information of the landing zone 850 where the wireless signal device 100 is located (for example, the floor information is determined or acquired by the floor information acquiring unit 130), thus determining whether to set the corresponding flag bit 122 to the state "0." Dynamically changing information of a floor where the elevator car 810 is located can be transmitted to the service control unit 110 by the elevator controller 820.

By taking the elevator service request command for an "up" elevator call as an example, if the floor information of the landing zone 850 where the wireless signal device 100 is located is N and the elevator car 810 stops on the $N^{th}$ floor and then moves upwards, the state control module 121 can rapidly determine that the elevator car 810 has moved to the $(N+1)^{th}$ floor after stopping at the landing zone 850 when the information of the floor where the elevator car 810 is located is (N+1). At this point, the flag bit $122_1$ is controlled to switch from the state "1" to the state "0," and the service control unit 110 can continue to receive the elevator service request command for an "up" elevator call, so that the elevator controller 820 prepares for the next elevator dispatching service process.

To further avoid that, for example, the elevator controller 820 does not timely respond to a certain elevator service request command sent by the passenger 90-2 to arrange an elevator dispatching service in the scenario as shown in FIG. 2 (for example, elevator service request commands having the same elevator call direction of other passengers are not received in a long period of time after the flag bit 122 is set to the state "0," and the flag bit 122 maintains the state "0" constantly), in an embodiment, the service control unit 110 stores the elevator service request command 220 received in a time period of stop in each elevator dispatching service process, and sends the stored elevator service request command 220 to the elevator controller 820 for controlling the elevator dispatching service when the corresponding flag bit 122 is switched from the state "1" to the state "0." As such, the elevator controller 820 can timely respond to the elevator service request command 220 received in the time period of stop, even if no passengers enter the landing zone 830 in a long time later.

In another embodiment, the wireless signal device 100 is further configured to receive the elevator service request command 220 again that is sent from the personal mobile terminal (for example, the passenger 90 does not enter the elevator car 810 in time and is still in the elevator landing zone 850) and not correspondingly responded to by the elevator controller 820 in the previous service process after the previous elevator dispatching service process is ended. Correspondingly, the service control unit 110 is further configured to arrange, through the elevator controller 820, the next elevator dispatching service process for the elevator service request command 220 received again. Specifically, the elevator service request command sent by the personal mobile terminal 200-2 is received again after the flag bit 122 is switched from the state "1" to the state "0." As such, by repeatedly sending the elevator service request command after the flag bit is set to the state "0," the elevator service request command sent by the passenger 90-2 not entering the stopped elevator car 810 within the time period of stop in the previous elevator dispatching service process will also be transmitted to the elevator controller 820 for controlling the elevator dispatching service, and the flag bit 122 is also timely switched from the state "0" to the state "1."

Still as shown in FIG. 1, the service control unit 11 can further include a sending module 123, which can be implemented by, for example, a Bluetooth communication unit. The sending module 123 can control whether to send the received elevator service request command 210 or 220 in a corresponding elevator call direction to the elevator controller 820 according to the state of each flag bit 122. Therefore, the foregoing action of "not sending" can be implemented by the sending module 123.

Still as shown in FIG. 1, the wireless signal device 100 is further provided with a responding unit 140. The responding unit 140 is configured to still send to the personal mobile terminal 200 information indicating that the elevator service request command 220 is successfully responded to, when the similar elevator service request command 220 is received in each elevator dispatching service but the elevator dispatching service is not controlled in response to the elevator service request command 220. For example, the personal mobile terminal 200-2 sends an elevator service request command for a "down" elevator call to the wireless signal device 100 when the flag bit $122_2$ is set to the state "1." The elevator service request command for a "down" elevator call is stopped from being sent to the elevator controller 820 in the state "1." The responding unit 140 can still send to the personal mobile terminal 200-2 information indicating that such an elevator service request command is successfully responded to. The passenger 200-2 can know that his/her "down" elevator call request has been responded to. The passenger 200-2 will not sense the foregoing action or process of stopping sending.

Still as shown in FIG. 1, the antenna 150 in the wireless signal device 100 not only can be used to broadcast a wireless signal or the like but also can send, for example, notification information indicating that such an elevator service request command is successfully responded to.

It should be noted that some blocks shown in FIG. 1 are functional entities, and not necessarily correspond to physically or logically independent entities. The functional entities can be implemented in the form of software, or implemented in one or more hardware modules or an integrated circuit, or implemented in different networks and/or processor devices and/or microcontroller devices. For example, when the wireless signal device 100 is a Bluetooth module, the service control unit 110, the stop determining unit 120, the floor information acquiring unit 130, and so on can be implemented by a Bluetooth processor.

When the application of the elevator system 80 or system for an elevator service request in the foregoing embodiments is mounted in the wireless signal device 100 of the landing zone 850, as shown in FIG. 2, assuming that the personal mobile terminal 200-1 of the passenger 90-1 and the personal mobile terminal 200-2 of the passenger 90-2 send elevator service request commands for an "up" elevator call successively, the elevator car 810 stops in the landing zone 850 in response to the elevator service request command 210 for an "up" elevator call sent by the personal mobile terminal 200-1 first. The flag bit $122_1$ is set to the state "1," the car door 811 is opened and the passenger 90-1 enters the elevator car 810. Even if the personal mobile terminal 200-2 of the passenger 90-2 in the distance sends the elevator service request command 220 for an "up" elevator call later, the elevator service request command 220 for an "up" elevator call sent by the personal mobile terminal 200-2 will not affect normal closing of the car door 811. Therefore, the experience of the passenger 90-1 is greatly improved, and the normal operating efficiency of the elevator car 810 will not be affected.

It should be noted that in a system for an elevator service request of the elevator system 80 according to an embodiment, the service control unit 110 in the wireless signal device 100 of the foregoing embodiment can be partially or wholly implemented in the elevator controller 820. For example, the elevator controller 820 is provided with a corresponding service control unit 110 corresponding to each landing zone 850. It would be appreciated that the system for an elevator service request in this example can also avoid the problem that the car door 811 of the elevator car 810 cannot be closed normally due to a subsequent elevator service request command from the personal mobile terminal 200.

Figure 3:
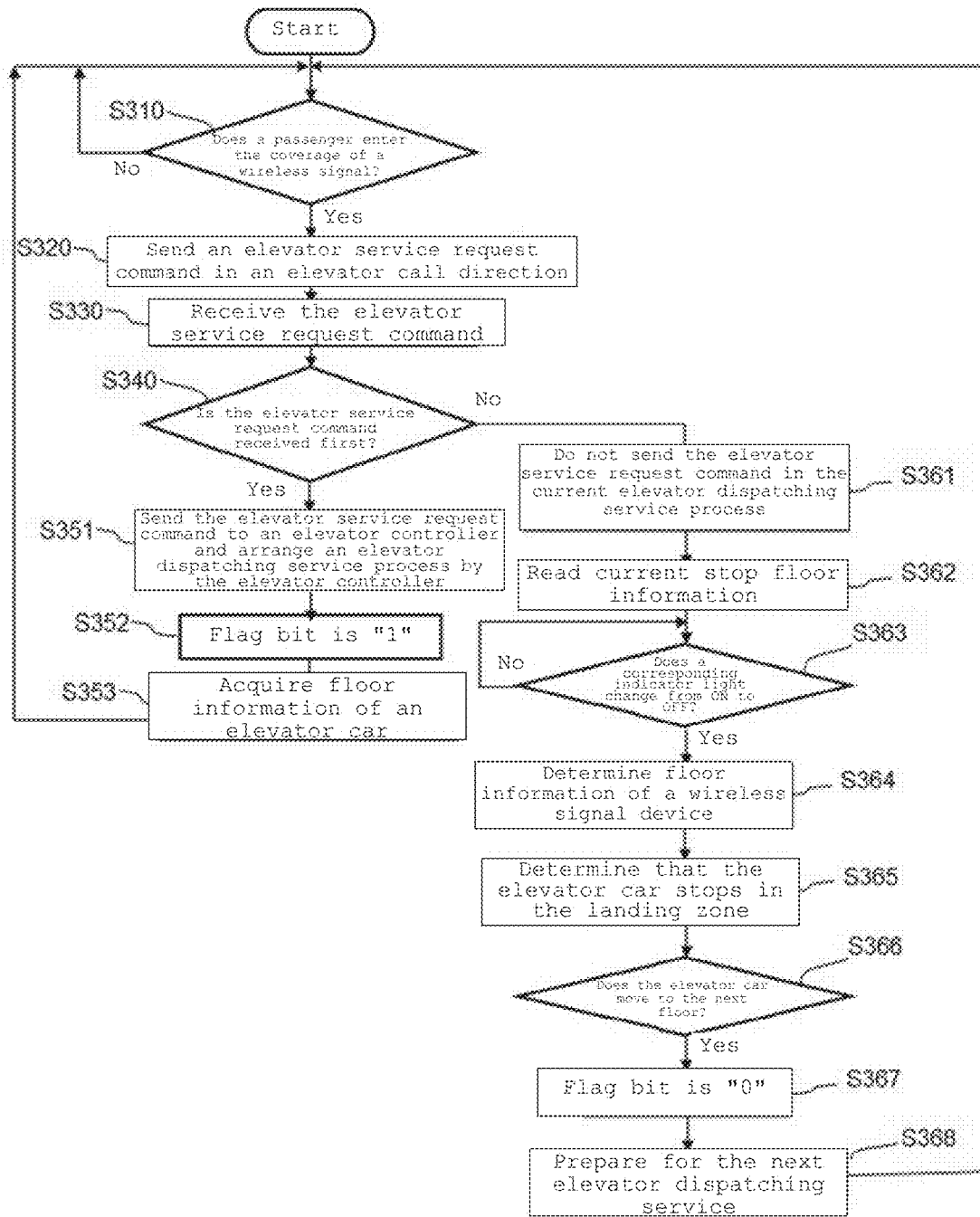
FIG. 3 is a flowchart of a method for an elevator service request according to an embodiment of the present invention.

FIG. 3 is a flowchart of a method for an elevator service request according to an embodiment of the present invention. The method shown in FIG. 3 is described based on one elevator dispatching service process, and the method can implement multiple elevator dispatching service processes for multiple passengers 90. The "one elevator dispatching service process" refers to an elevator dispatching service process performed by the elevator car 810 for an elevator service request command in a certain elevator call direction; the elevator dispatching service process corresponds to an allocated elevator car 810, and includes a process from the moment when the elevator car 810 begins to stop in the landing zone 850 till the moment when the elevator car begins to leave from the landing zone 850. For example, it may be a process from the moment when the response to the elevator service request command 210 begins till the moment when the elevator car 810 dispatched to stop begins to leave from the landing zone 850.

The method for an elevator service request according to an embodiment of the present invention is illustrated in the following with reference to FIG. 1 to FIG. 3.

First of all, as shown in FIG. 2 and FIG. 3, in step S310, it is judged whether there is a passenger 90 entering the coverage 101 of the wireless signal. If the judgment is "yes," step S320 is performed. If the judgment is "no," the judgment process is continued.

In step S320, the personal mobile terminal 200 of the passenger 90-1 sends an elevator service request command in an elevator call direction, for example, an elevator service request command for an "up" elevator call. Description is provided in the following by taking the elevator service request command being an elevator service request command for an "up" elevator call as an example.

In step S330, the wireless signal device 100 receives the elevator service request command for an "up" elevator call. In this step, the personal mobile terminal 200 establishes a wireless connection with the wireless signal device 100 and transmits the elevator service request command. It should be noted that the flag bit 122₁ has been set to the state "0" each time an elevator dispatching service process begins.

In step S340, it is judged whether the received command is the first elevator service request command for an "up" elevator call received when the flag bit 122₁ is set to the state "0."

If the judgment is "yes," step S351 is performed. In step S351, the elevator service request command for an "up" elevator call is sent to the elevator controller 820 and is responded to by the elevator controller 820. For example, the elevator controller 820 arranges an elevator dispatching service process based on the elevator service request command for an "up" elevator call.

In step S352, the flag bit 122₁ is switched from the state "0" to the state "1".

In step S353, at the same time, information of a floor where the elevator car 810 is located is continuously acquired from the elevator controller 820.

In Step 340, if the judgment is "no," step S361 is performed, in which if an elevator service request command in the same direction is received again in the current elevator dispatching service process, sending of the elevator service request command is stopped or the elevator service request command is not sent to the elevator controller 820.

In step S362, current stop floor information is read, for example, stop floor information for broadcasting can be read from the elevator controller 820.

In step S363, it is judged whether the elevator service request indicator light 363 mounted in the same landing zone 850 changes from ON to OFF. In this step, state information of the elevator service request indicator light 363 can be obtained from the elevator controller 820, or the state information can be acquired or sensed from the elevator service request indicator light 363.

In step S364, corresponding stop floor information when a corresponding elevator service request indicator light changes from ON to OFF is acquired and used as floor information of the landing zone 850 where the wireless signal device 100 is located, thus determining the floor information of the landing zone In step S365, when a corresponding elevator service request indicator light 830 of the landing zone 850 changes from ON to OFF, it is determined that the elevator car 810 stops in the landing zone 850. In another embodiment, it is judged whether the latest stop floor information read in step S362 is the same as the floor information of the landing zone where the wireless signal device is located determined in step S364, and if yes, it is determined that the elevator car 810 stops in the landing zone 850. Otherwise, the elevator car 810 stops in another landing zone 850.

In step S366, it is judged whether the elevator car has moved to the next floor of the landing zone 850, for example, an upper floor of the landing zone 850, by comparing information of a floor where the elevator car 810 is located sent by the elevator controller 820 with the floor information of the landing zone where the wireless signal device is located determined in step S364. If the judgment is "yes," step S367 is performed, and the flag bit is set to the state "0."

At this point, one elevator dispatching service process is basically completed, and step S368 is performed to prepare for the next elevator dispatching service process.

It would be appreciated that the method process of step S330 to step S340, step S351 to step S353, and step S361 to step S368 can be performed in the wireless signal device 100 in each landing zone 850.

It would be appreciated that in the flowchart and/or block diagrams of the method, the system and the device according to the embodiments of the present application, the descriptions of the flowchart and/or each block in the block diagrams and combinations of the descriptions of the flowchart and/or the block diagrams can be implemented by computer program instructions. The computer program instructions may be provided to a general-purpose computer, a special-purpose computer, or a processor of other programmable data processing equipment to constitute a machine, such that the instructions executed by the computer or the processor of the other programmable data processing equipment create a component for implementing functions/operations designated in the flowcharts and/or blocks and/or one or more block flowcharts.

The computer program instructions may be stored in a computer readable memory. The instructions can instruct the computer or another programmable processor to implement functions in a specific manner, such that the instructions stored in the computer readable memory constitute an article of manufacture including an instruction component for implementing functions/operations designated in one or more blocks of the flowcharts and/or block diagrams.

The computer program instructions may be loaded onto the computer or another programmable data processor to execute a series of operation steps on the computer or another programmable processor to generate computer-implemented processes, so that the instructions executed on the computer or another programmable data processor provide steps for implementing functions or operations designated in one or more blocks of the flowcharts and/or the block diagrams. It should be further noted that in some alternative implementations, the functions/operations shown in the blocks may not take place according to the sequence shown in the flowchart. For example, two blocks shown sequentially may be performed substantially at the same time, or these blocks sometimes may be performed in a reversed order, which specifically depends on the functions/operations involved.

The foregoing descriptions are exemplary and are not defined to be limitative. Various non-limitative implementation solutions are disclosed in this text. However, according to the foregoing teaching, those of ordinary skill in the art will be aware that various modifications and variations will fall within the scope of the appended claims. Therefore, it should be appreciated that the disclosure content other than those specifically disclosed can be implemented within the scope of the appended claims. Therefore, the appended claims should be read up to determine the real scope and content.

What is claimed is:

1. A wireless signal device for broadcasting a wireless signal, wherein the wireless signal device is mounted in a landing zone and receives one or more elevator service request commands from a personal mobile terminal, and the wireless signal device is capable of communicating with an elevator controller of an elevator system and sending the received elevator service request command(s) to the elevator controller for controlling an elevator dispatching service, characterized in that the wireless signal device further comprises a service control unit configured to, in an elevator dispatching service process arranged in response to a first elevator service request command received previously, disable the elevator controller from responding to a second elevator service request command received later for controlling the elevator dispatching service in the elevator dispatching service process if the second elevator service request command has the same elevator call direction as the first elevator service request command, wherein the elevator dispatching service process is from the moment when the response to the first elevator service request command begins till the moment when an elevator car dispatched to stop begins to leave from the landing zone.

2. The wireless signal device of claim 1, characterized in that the service control unit is further configured to determine that the elevator car begins to leave from the landing zone when the elevator car has moved to a next floor.

3. The wireless signal device of claim 1, characterized in that the wireless signal device is further configured to receive the second elevator service request command again that is sent from the personal mobile terminal and not correspondingly responded to by the elevator controller in the service process after the elevator dispatching service process is ended; and the service control unit is further configured to arrange, through the elevator controller, a next elevator dispatching service process for the second elevator service request command received again.

4. The wireless signal device of claim 1, characterized in that the service control unit is further configured to:
store the second elevator service request command received in a time period when the elevator car stops in the landing zone in the elevator dispatching service process, and send the second elevator service request command to the elevator controller for controlling the elevator dispatching service after the elevator car begins to leave from the landing zone.

5. The wireless signal device of claim 1, characterized in that the service control unit is further configured to:
disable the elevator controller from responding to the second elevator service request command for controlling the elevator dispatching service by not sending the second elevator service request command to the elevator controller in the elevator dispatching service process.

6. The wireless signal device of claim 1, characterized in that the service control unit is provided with a corresponding flag bit for the elevator service request command in each elevator call direction;

when the flag bit is set to a first state, the elevator controller is disabled from responding to the elevator service request command having the same elevator call direction as the first elevator service request command for controlling the elevator dispatching service in the elevator dispatching service process; and when the flag bit is set to a second state, the elevator controller is enabled to arrange a corresponding elevator dispatching service process in response to the first elevator service request command.

7. The wireless signal device of claim 6, characterized in that the service control unit is provided with:
a state control module configured to switch the flag bit from the first state to the second state when it is determined that an elevator car dispatched to stop begins to leave from the landing zone in each elevator dispatching service process.

8. The wireless signal device of claim 6, characterized in that the state control module is further configured to:
switch the flag bit from the second state to the first state when the first elevator service request command is received for the first time in the second state.

9. The wireless signal device of claim 5, characterized in that the service control unit further comprises:
a sending module configured to control whether to send the received elevator service request command(s) to the elevator controller.

10. The wireless signal device of claim 1, characterized by further comprising:
a stop determining unit configured to determine that the elevator car dispatched to stop stops in the landing zone when stop floor information sent by the elevator controller is the same as floor information of the landing zone where the wireless signal device is located or a corresponding elevator service request indicator light of the landing zone changes from ON to OFF.

11. The wireless signal device of claim 1, characterized by further comprising:
a floor information acquiring unit configured to acquire the corresponding stop floor information when the elevator service request indicator light changes from ON to OFF and use the corresponding stop floor information as the floor information of the landing zone where the wireless signal device is located, wherein the elevator service request indicator light and the wireless signal device are mounted on the same floor.

12. The wireless signal device of claim 11, characterized in that the floor information acquiring unit is configured to acquire the stop floor information from the elevator controller.

13. The wireless signal device of claim 11, characterized in that the floor information acquiring unit is configured to:
obtain state information of the elevator service request indicator light from the elevator controller, or acquire the state information of the elevator service request indicator light by connecting to the light.

14. The wireless signal device of claim 7, characterized in that the state control module is further configured to determine whether the elevator car has moved to the next floor by comparing information of a floor where the elevator car is located sent by the elevator controller with floor information of the landing zone where the wireless signal device is located.

15. The wireless signal device of claim 1, characterized by further comprising:
a responding unit configured to still send to the personal mobile terminal information indicating that the second elevator service request command is successfully responded to, when the second elevator service request command is received in the elevator dispatching service but the elevator dispatching service is not controlled in response to the second elevator service request command.

16. The wireless signal device of claim 1, characterized in that the elevator dispatching service process is from the moment when the response to the first elevator service request command begins till the moment when the elevator car dispatched to stop begins to leave from the landing zone.

17. The wireless signal device of claim 1, characterized in that the wireless signal device is a Bluetooth module or a Bluetooth low energy module.

18. A system for an elevator service request, characterized by comprising:
- a wireless signal device mounted in a landing zone and configured to broadcast a wireless signal, wherein the wireless signal device receives one or more elevator service request commands from a personal mobile terminal carried by a passenger; and
- an elevator controller communicating with the wireless signal device and capable of controlling an elevator dispatching service based on the received elevator service request command(s);

characterized by further comprising:
- a service control unit configured to, in an elevator dispatching service process arranged in response to a first elevator service request command received previously, disable the elevator controller from responding to a second elevator service request command received later for controlling the elevator dispatching service in the elevator dispatching service process if the second elevator service request command has the same elevator call direction as the first elevator service request command, wherein the elevator dispatching service process is from the moment when the response to the first elevator service request command begins till the moment when an elevator car dispatched to stop begins to leave from the landing zone.

19. An elevator system, comprising:
an elevator car; and
an elevator controller configured to control an elevator dispatching service over one or more elevator cars based on elevator service request commands;
characterized in that the elevator system further comprises the wireless signal device of claim 1.

20. A method for an elevator service request, characterized by comprising steps of:
receiving, through a wireless signal device mounted in a landing zone, one or more elevator service request commands from a personal mobile terminal;
enabling an elevator controller to arrange an elevator dispatching service process in response to a first elevator service request command received previously; and
disabling the elevator controller from responding to a second elevator service request command received later for controlling an elevator dispatching service in the elevator dispatching service process if the second elevator service request command has the same elevator call direction as the first elevator service request command,
wherein the elevator dispatching service process is from the moment when the response to the first elevator service request command begins till the moment when an elevator car dispatched to stop begins to leave from the landing zone.

* * * * *